(12) United States Patent
Uchida et al.

(10) Patent No.: US 9,944,178 B2
(45) Date of Patent: Apr. 17, 2018

(54) POWER TAKEOFF UNIT FOR AUTOMOBILE

(71) Applicant: GKN Driveline Japan Ltd., Tochigi (JP)

(72) Inventors: Noboru Uchida, Utsunomiya (JP); Masaki Takahashi, Kanuma (JP)

(73) Assignee: GKN Driveline Japan Ltd., Tochigi, Tochigi (JP)

( * ) Notice: Subject to any disclaimer, the term of this patent is extended or adjusted under 35 U.S.C. 154(b) by 78 days.

(21) Appl. No.: 15/140,824

(22) Filed: Apr. 28, 2016

(65) Prior Publication Data

US 2016/0236567 A1   Aug. 18, 2016

Related U.S. Application Data

(63) Continuation of application No. PCT/JP2013/006734, filed on Nov. 15, 2013.

(51) Int. Cl.
*F16H 35/00* (2006.01)
*F16D 27/14* (2006.01)
(Continued)

(52) U.S. Cl.
CPC .......... *B60K 17/348* (2013.01); *B60K 17/344* (2013.01); *B60K 17/35* (2013.01);
(Continued)

(58) Field of Classification Search
CPC .................................................... B60K 17/348
See application file for complete search history.

(56) References Cited

U.S. PATENT DOCUMENTS 4,744,435 A * 5/1988 Schnurer ................ B60K 17/34
180/233
5,450,921 A * 9/1995 Kameda ................... B60K 5/04
180/297
(Continued)

FOREIGN PATENT DOCUMENTS

DE    10 2010 039445 A1    2/2012
EP         0377415 A1    7/1990
(Continued)

OTHER PUBLICATIONS

JPO Office Action for JP2016-524169 dated Feb. 6, 2017 (6 pages).
(Continued)

*Primary Examiner* — Tony H Winner
(74) *Attorney, Agent, or Firm* — Bejin Bieneman PLC

(57) ABSTRACT

A power takeoff unit is comprised of: a casing dividable into a first part and a second part; an inner shaft receiving torque from an engine; an outer shaft independently rotatable and coaxial with the inner shaft; a clutch for connecting the inner shaft with the outer shaft; an actuator configured to connect the clutch; an output shaft for outputting torque; and a gear set drivingly coupling the outer shaft with the output shaft, wherein the outer shaft and the output shaft are rotatably supported by the first part, the clutch is rotatably supported by the second part, and the actuator is fixed to the second part, whereby the clutch and the actuator along with the second part are separable from the first part.

9 Claims, 4 Drawing Sheets

(51) Int. Cl.
    *B60K 17/348*     (2006.01)
    *B60K 17/344*     (2006.01)
    *B60K 17/35*     (2006.01)
    *F16D 27/118*     (2006.01)
    *B60K 17/02*     (2006.01)

(52) U.S. Cl.
    CPC ............ *F16D 27/118* (2013.01); *B60K 17/02* (2013.01); *B60Y 2304/07* (2013.01)

(56) References Cited

U.S. PATENT DOCUMENTS

| | | | |
|---|---|---|---|
| 8,667,864 B2 * | 3/2014 | Kenmotsu | B60K 17/34 180/249 |
| 2012/0083380 A1 | 4/2012 | Reed et al. | |
| 2012/0234120 A1 | 9/2012 | Fukuda et al. | |
| 2013/0226421 A1 * | 8/2013 | Horaguchi | B60K 17/344 701/67 |
| 2016/0023550 A1 * | 1/2016 | Onitake | B60K 17/348 180/247 |

FOREIGN PATENT DOCUMENTS

| | | | |
|---|---|---|---|
| JP | 2012136141 A | 7/2012 |
| JP | 2012193779 A | 10/2012 |
| JP | 2012-218573 A | 11/2012 |

OTHER PUBLICATIONS

International Search Report and Written Opinion for PCT/JP2013/006734 dated Mar. 18, 2014 (10 pages).

\* cited by examiner

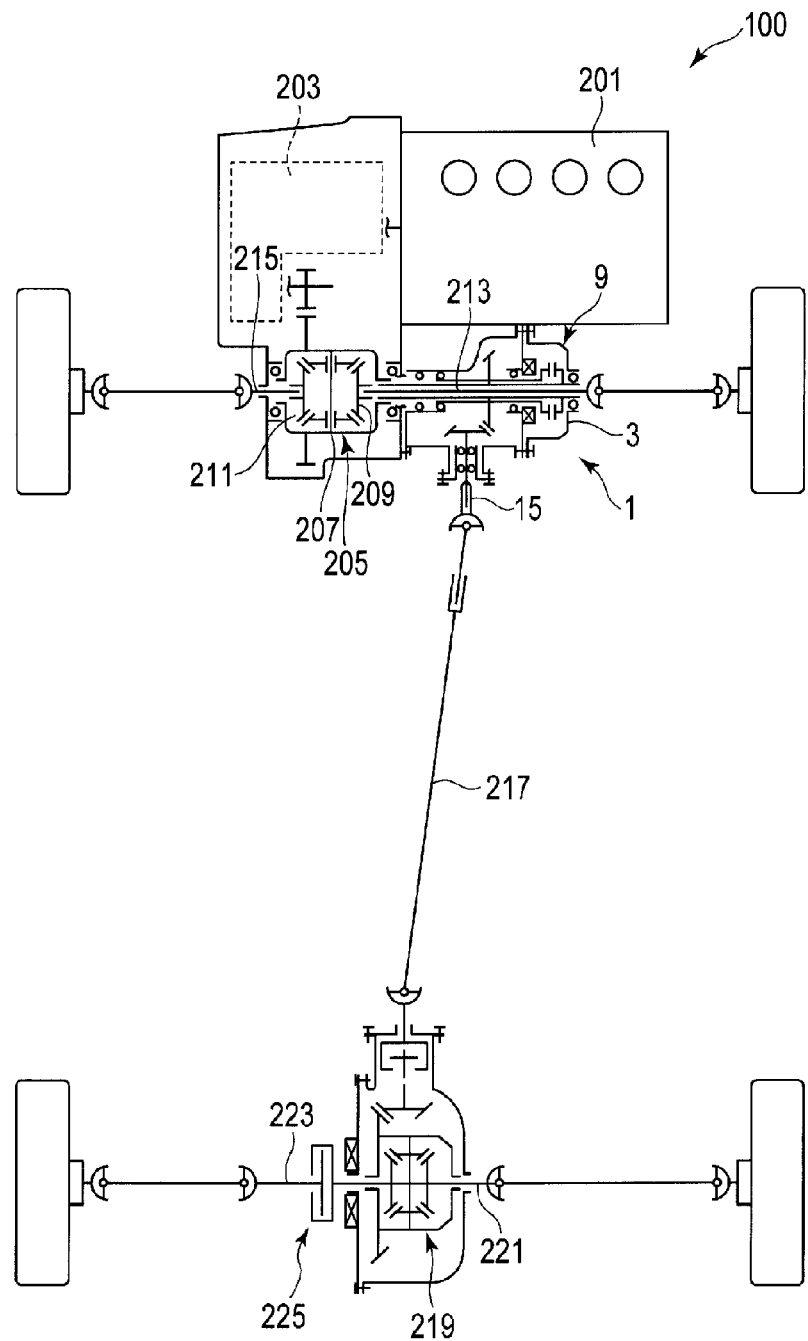
[Fig. 1]

[Fig. 2]
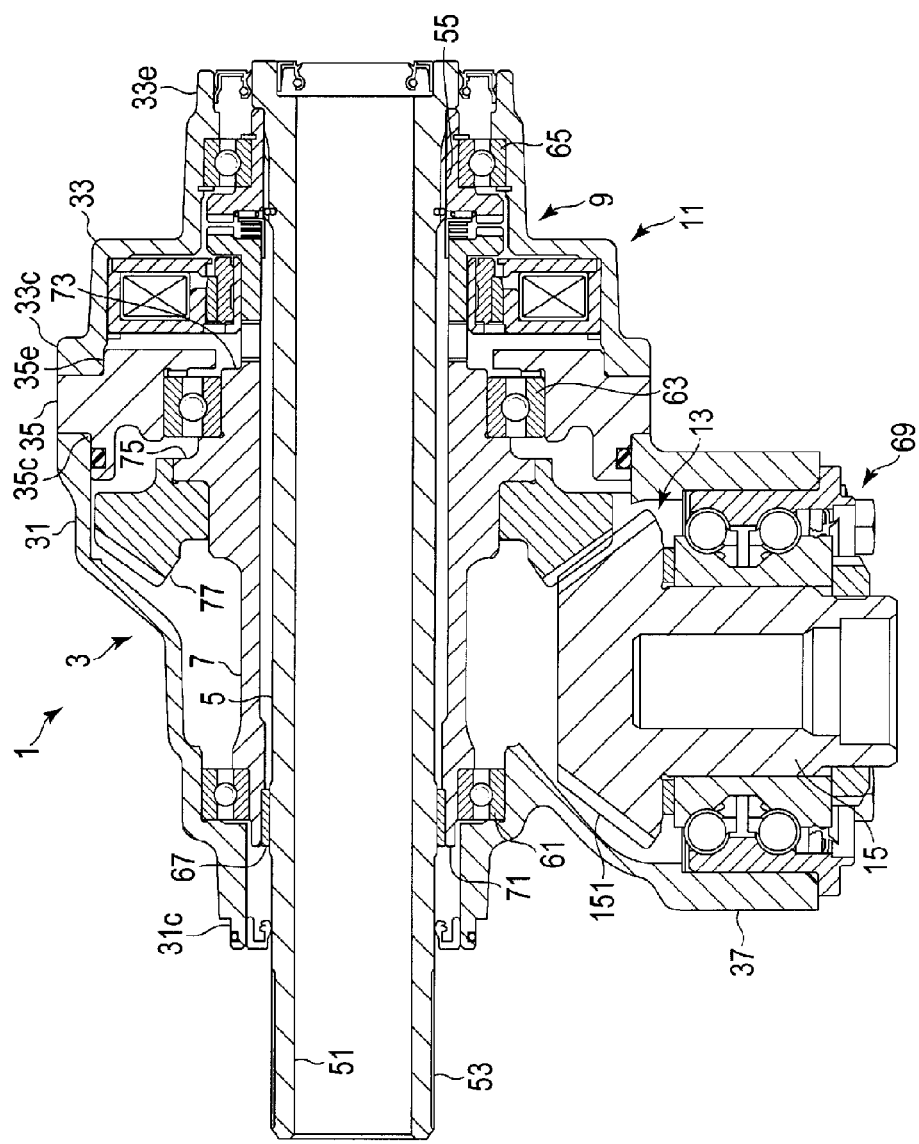

[Fig. 3]
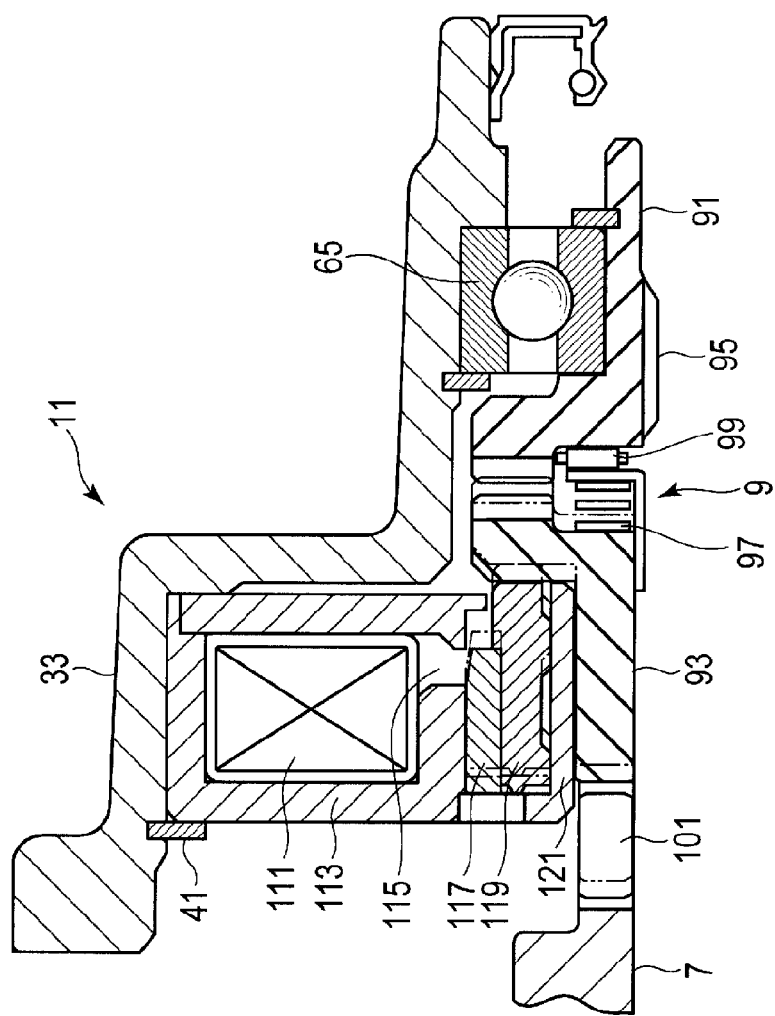

[Fig. 4]
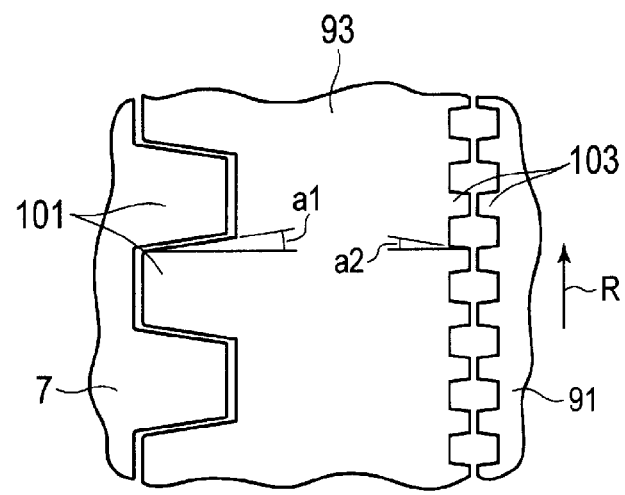
[Fig. 5]
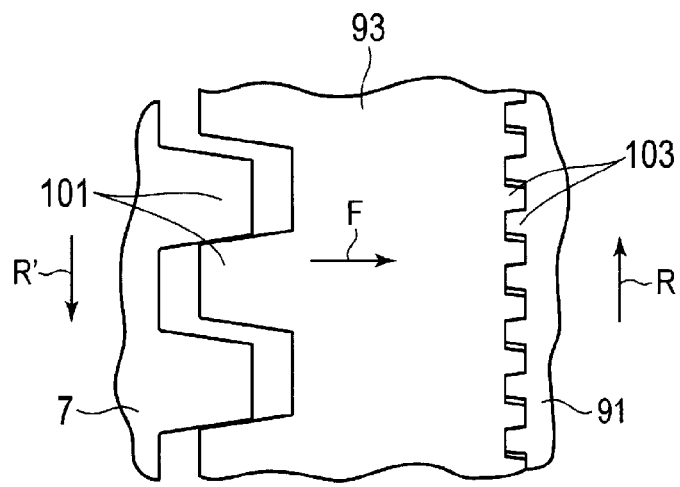

POWER TAKEOFF UNIT FOR AUTOMOBILE

CROSS-REFERENCE TO RELATED APPLICATIONS

This application is a continuation Application of PCT International Application No. PCT/JP2013/006734 (filed Nov. 15, 2013), the entire contents of which are incorporated herein by reference.

BACKGROUND

In an automobile of front-wheel drive for example, an engine set at the front of the vehicle's body generates torque, and a differential receives and distributes this torque to right and left front wheels. In a case of a four-wheel drive vehicle, a power takeoff unit (PTU) is, in general, in combination with a transmission with a differential, used to take off torque in part and transmit it to rear wheels.

A construction that time-limitedly switches its drive mode into a two-wheel drive mode is often applied even to a four-wheel drive vehicle loaded with a PTU. In this case, one or more clutches for temporarily cutting off power transmission are inserted into any part of a powertrain system from the PTU through the rear-differential. When one of the clutches gets disengaged, the engine does not bear rotation of part of the transmission downstream relative to the concerned clutch and therefore this construction is advantageous in improvement of energy consumption.

Japanese Patent Unexamined Application Laid-open No. 2012-193779 discloses a related art. To maximize energy consumption improvement, it is advantageous to provide at least one of the clutches to an upstream section in the transmission path of the torque, and therefore, in the example of Japanese Patent Unexamined Application Laid-open No. 2012-193779, a clutch is incorporated in a PTU. The PTU is inevitably designed to have a complex structure, which causes some problems. For example, its assembly inherently becomes troublesome and accordingly its disassembly also becomes troublesome, thereby causing problems in maintenance. Further, modification of the construction of the PTU is difficult to realize by partially changing the construction and instead it is necessary to replace the PTU as a whole with a PTU structured in a desired construction. The device described below has been devised in light of these problems.

SUMMARY

The disclosure herein includes a power transmission device of an automobile and in particular relates to a power takeoff unit for an automobile for distributing torque from axles to the other axles of a four-wheel drive vehicle.

According to an aspect, a power takeoff unit for taking off torque from a transmission of an automobile is comprised of: a casing dividable into a first part and a second part combined together; an inner shaft formed to be hollow to allow insertion of a shaft of the transmission and coupled with the transmission to rotate about an axis; an outer shaft independently rotatable and coaxial with the inner shaft; a clutch interposed between the inner shaft and the outer shaft and configured to drivingly connect the inner shaft with the outer shaft when the clutch is connected; an actuator configured to connect the clutch; an output shaft being so disposed as to be rotatable and intersect with, or be not parallel and not intersect with, the outer shaft; and a gear set drivingly coupling the outer shaft with the output shaft, wherein the outer shaft and the output shaft are rotatably supported by the first part, the clutch is rotatably supported by the second part, and the actuator is fixed to the second part, whereby the clutch and the actuator along with the second part are separable from the first part.

BRIEF DESCRIPTION OF THE DRAWINGS

FIG. 1 is a drawing schematically showing a powertrain system of an automobile.

FIG. 2 is a cross sectional view of an example power takeoff unit, which shows planes passing through both central axes of an input shaft and an output shaft.

FIG. 3 is a partial sectional view magnifying a clutch and an actuator for driving the clutch in the example power takeoff unit.

FIG. 4 is a plan view schematically showing peripheries of clutch members in a state before connecting the clutch.

FIG. 5 is a plan view schematically showing the peripheries of the clutch members in a state of connecting the clutch.

DETAILED DESCRIPTION OF EXEMPLARY EMBODIMENTS

Exemplary embodiments will be described hereinafter with reference to the appended drawings.

Throughout the following description and appended claims, the term "axial direction" means a direction of axes of an inner shaft 5 and an outer shaft 7 unless otherwise stated.

Referring to FIG. 1, a powertrain system of an automobile 100 is for example comprised of an engine and/or electric motor 201 and a transmission 203 at the front of the vehicle's body. The transmission 203 is comprised of a front differential 205, a casing 207 that receives torque from the engine and/or electric motor 201 to rotate.

The front differential 205 is equipped with a differential gear set to transmit torque, which is input into the casing 207, to right and left axles 213, 215 via each of its side gears 209, 211, allowing differential motion therebetween. A bevel gear type is an example of the differential gear but any other type may be applied thereto.

In the example four-wheel drive vehicle shown in the drawings, its rear part is further comprised of a rear differential 219 coupled with rear axles 221, 223, thereby allowing differential motion between rear wheels. Further, to cut off torque transmission to the left rear axle 223 a clutch 225 is provided, for example. The clutch 225 is, along with the rear differential 219, housed in a carrier casing. The clutch 225 may be provided on, instead of the left rear axle 223, a right rear axle 221 or a propeller shaft 217.

For the purpose of transmitting torque in part from the transmission 203 via the propeller shaft 217 to the rear differential 219, a power takeoff unit (PTU) 1 is used.

The PTU 1 takes off part of the torque transmitted to the differential casing 207 and transmits it to the output shaft 15. The output shaft 15 is coupled with the rear differential 219 via a constant-velocity joint and the propeller shaft 217. To cut off the torque transmission, the PTU 1 is comprised of a clutch 9. When the clutch 9 gets disconnected in concert with the clutch 225, the propeller shaft 217 is separated from the system.

Referring to FIG. 2, the PTU 1 is comprised of an inner shaft 5, an outer shaft 7 independently rotatable and coaxial therewith, a clutch 9 for, when connected, drivingly connecting the inner shaft 5 with the outer shaft 7, an actuator 11 for operating the clutch 9, and an output shaft 15 drivingly coupled with the outer shaft 7 by a gear set 13, all of which is housed in a casing 3. Although further descriptions will be given below, the inner shaft 5 is coupled with the differential casing 207 to receive its torque, and thus the torque is, when the clutch 9 is connected, transmitted to the outer shaft 7 and output via the gear set 13 to the output shaft 15.

The casing 3 is separable into a first part 31 and a second part 33. The casing 3 is structured so as to seal its interior when the second part 33 is combined with the first part 31 with its internal members housed therein.

The casing 3 coaxially supports the inner shaft 5, the outer shaft 7, the clutch 9, and the actuator 11. The first part 31 of the casing 3 is comprised of a portion 37 directed in a direction distinct from the direction of this common axis, and this portion 37 supports the output shaft 15 directed to intersect with, or be not parallel and not intersect with, (namely, be in a skew relation with) the outer shaft 7.

The first part 31 is, at its end 31c, combinable with the transmission 203. The first part 31 houses and rotatably supports the outer shaft 7, the gear set 13 and the output shaft 15. The second part 33 houses the clutch 9 and the actuator 11, rotatably supports the clutch 9 and anti-rotatably supports the actuator 11. Although further descriptions will be given below, when the second part 33 is separated from the first part 31, the clutch 9 and the actuator 11 are in association therewith separated from the other elements.

The first part 31 may further include a third part 35 separable therefrom. The outer shaft 7 is, in a state where the third part 35 is separated, housed into the first part 31 and, by combining the third part 35 with the first part 31, supported by them. To allow rotation thereof, bearings 61, 63 such as ball bearings are interposed between the outer shaft 7 and the casing 3. One bearing 61 may be supported by the first part 31 and another bearing 63 may be supported by the third part 35.

To precisely hold the third part 35 in place relative to the first part 31, the third part 35 may be comprised of a structure 35c fitting in the internal surface of the first part 31. Alternatively, in reverse, the first part 31 may fit in the internal surface of the third part 35. To prevent leakage of internal oil, an O-ring or a gasket may be interposed therebetween.

Likewise, to precisely hold the second part 33 in place relative to the first part 31, the third part 35 may be comprised of a structure 35e fitting in the internal surface of the second part 33. Alternatively, in reverse, the second part 33 may fit in the internal surface of the third part 35. To likewise prevent leakage of internal oil, an O-ring or a gasket may be interposed therebetween.

The second part 33 is fixed to the first part 31 by means of fastener elements such as bolts inserted therein in the axial direction from its end 33c. The fastener elements may penetrate the third part 35 and may be tightened to the first part 31, thereby fixing these three parts together. Alternatively, individual fastener elements may be used for fixation between the first part 31 and the third part 35 and for fixation between the second part 33 and the third part 35.

The outer shaft 7 is hollow and the inner shaft 5 coaxially extends to penetrate it. Around an end 71 close to the front differential 205, e.g., overlapping with the bearing 61, a plain bearing member 67 is interposed between the outer shaft 5 and the inner shaft 7, thereby rotatably supporting the inner shaft 5.

The inner shaft 5 is also hollow and the axle 213 extends rightward through its internal cavity 51. On an end portion of the inner shaft 5 closer to the front differential 205, splines 53 are cut in the axial direction, thereby being drivingly coupled with the differential casing 207. The end portion may be made slightly smaller in diameter than a portion in contact with the plain bearing member 67 so as not to impede press-fitting the plain bearing member 67.

Around an end portion at its opposite side of the inner shaft 5, splines 55 are cut in the axial direction and are used to drivingly couple the inner shaft 5 with a first clutch member 91 described later. The inner shaft 5 is, around the splines 55, and along with the first clutch member 91, rotatably supported by a bearing 65 such as a ball bearing.

An end 73 of the outer shaft 7 opposed to the end 71 toward the front differential 205 is exposed through an opening of the third part 35 toward the second part 33 and thus approaches the clutch 9. Although further descriptions will be given below, the end 73 of the outer shaft 7 and a second clutch member 93 of the clutch 9, as shown in FIGS. 4 and 5, engage with each other by means of first teeth 101, thereby transmitting the torque.

Referring back to FIG. 2, the outer shaft 7 can, at the midway part between both the ends 71,73, be made greater in diameter, and a bevel gear 77 fixed here. For the purpose of fixation and to receive thrust force, a flange portion 75 may integrally project out therefrom. The fixation of the bevel gear 77 may be made by press-fitting, bolt fixation using the flange portion 75, or welding.

In the example shown in FIG. 2, teeth of the bevel gear 77 are directed toward the front differential 205 and the flange portion 75 abuts on the back of the bevel gear 77. This arrangement is advantageous in bringing the output shaft 15 that engages with the bevel gear 77 closer to the front differential 205 and accordingly embodying an arrangement in which the propeller shaft 217 is brought closer to the center of the automobile 100. Of course, this arrangement can be arbitrarily modified.

The output shaft 15 is disposed so as to intersect with, or be not parallel and not intersect with, the outer shaft 7. The output shaft 15 is, at one end thereof, and preferably as a unitary body, comprised of a gear 151. The combination of the gear 151 and the bevel gear 77 constitutes the bevel or hypoid gear set 13. The torque transmitted to the outer shaft 7 is thereby output to a direction distinct from its axial direction through the output shaft 15.

For the purpose of rotatably supporting the output shaft 15, a bearing set 69 is available. The output shaft 15 and the bearing set 69 may be assembled in advance and then unitarily incorporated into the portion 37 of the casing 3.

Referring to FIG. 3 in combination with FIG. 2, the clutch 9 is in general constituted of the first clutch member 91 and the second clutch member 93.

The first clutch member 91 is generally cylindrical, its outer face being rotatably supported by the bearing 65, and, on its outer face, splines 95 are cut in the axial direction. As described above, the splines 95 mesh with the splines 55 of the inner shaft 5 so that the inner shaft 5 and the first clutch member 91 rotate together. Further, the inner shaft 5 is rotatably supported by the bearing 65 with having the first clutch member 91 interposed therebetween.

The second clutch member 93 is also generally cylindrical, fits in the actuator 11, thereby being supported, and is movable in the axial direction. Alternatively, instead of intervening between the actuator 11 and the inner shaft 5, the second clutch member 93 may be supported directly, or by a bearing interposed therebetween, by the second part 33. Referring to FIGS. 4 and 5, the first clutch member 91 and the second clutch member 93 comprise second teeth 103 engageable with each other, thereby forming the clutch 9.

Referring back to FIG. 3, the actuator 11 drives the second clutch member 93 in the axial direction to operate the clutch 9. The actuator 11 can use a solenoid, for example. Alternatively, instead of the solenoid, another device such as a pneumatic or hydraulic device may be used. The solenoid is comprised of a coil 11 wound in the circumferential direction to generate magnetic flux, and a core 113 for conducting the generated magnetic flux.

The coil 11 is made of a conductor such as copper and is molded in resin. The core 113 is made of a magnetic material and surrounds the coil 111, leaving a gap 115 at its inner periphery. The core 113 fits in a corner of the second part 33, and a tab 41 fits in an inner periphery of the second part 33 so as to prevent its displacement.

To bridge the gap 115, a cylindrical or ring-like plunger 117 fits in the core 113 and is also of a magnetic material. More specifically, the combination of the core 113 and the plunger 117 forms a closed magnetic circuit enclosing the coil 111. The magnetic flux does not leap over the gap 115 but generally flows through the plunger 117, thereby driving the plunger 117 in the axial direction.

A by-plunger 119 can further fit in the plunger 117. The by-plunger 119 is also cylindrical or ring-like but is of a nonmagnetic material and fixed to the plunger 117 so as to move together. One end of the by-plunger 119 abuts on the second clutch member 93 and drives it in the axial direction. Intervention of the by-plunger 119 of the nonmagnetic material is advantageous to suppression of leakage of the magnetic flux.

Between the plunger 117 or the by-plunger 119 and the second clutch member 93, a sleeve portion 121 may be interposed. This is advantageous as this stabilizes support of the second clutch member 93 and limits contact points between the plunger 117 or the by-plunger 119 and the second clutch member 93. The sleeve portion 121 may be radially extended from the solenoid or any other stationary member. The plunger 117 and the by-plunger 119 are movable in the space between the core 113 and the sleeve portion 121.

A repulsive body 97 such as a spring can intervene between the first clutch member 91 and the second clutch member 93. The repulsive body 97 biases the second clutch member 93 toward the direction where the clutch 9 gets disconnected. To reduce friction of the repulsive body 97, a thrust bearing 99 is used.

As described already, the end 73 of the outer shaft 7 and the second clutch member 93 engage with each other by means of the first teeth 101, and the first clutch member 91 and the second clutch member 93 are engageable with each other by means of the second teeth 103. Referring to FIG. 4, to retain the engagement of the first teeth 101 even when the second teeth 103 engage, the first teeth 101 have a teeth length longer than the second teeth 103. To facilitate engagement, any of the first teeth 101 and the second teeth 103 may form a relatively small angle with the axial direction. An angle a1 that the first angle forms may be made relatively large so as to give a cam function to the first teeth 101. In this case, an angle a2 that the second teeth 103 forms can be made smaller than the angle a1 that the first teeth 101 form.

The first clutch member 91 follows the rotation of the inner shaft 5 to be in rotational motion R. Before the clutch 9 is connected, the outer shaft 7 and the second clutch member 93 do not necessarily rotate in accordance with the rotational motion R but can be at rest, for example. Referring to FIG. 5, the solenoid, when excited, drives the second clutch member 93 in the axial direction so that the clutch 9 is connected. Then the second clutch member 93 follows the first clutch member 91 to produce a relative rotation R' between the second clutch member 93 and the outer shaft 7. This relative rotation R', by the cam function of the first teeth 101, produces an axial force F, which acts on the second teeth 103 to enhance its connection. More specifically, the cam function of the first teeth 101 assists the actuator 11 to retain the connection of the clutch 9. Although the second teeth 103 produce a counter cam function in forming the angle a2, if a2 is smaller than the angle a1 that the first teeth 101 form, the cam function of the first teeth 101 is superior to the cam function of the second teeth 103, thereby ensuring the function of assistance by the first teeth 101. When suspending the excitation, the clutch 9 is disconnected by the repulsive body 97.

Meanwhile, while in the aforementioned example the combination of the first clutch member 91 and the second clutch member 93 forms a clutch and the combination of the second clutch member 93 and the outer shaft 7 steadily forms a coupling, this relation may be reversed. In this case, the second clutch member may be directly coupled with the inner shaft 5 and, for this coupling, an axially movable spline-coupling is used.

In the present example, a part that belongs to the first part 31 and another part that belongs to the second part 33 can be respectively independently assembled. More specifically, a process for incorporating the outer shaft 7 into the first part 31 can be pursued independent of assembly of the second part 33. A process for incorporating the clutch 9, the actuator 11 and the inner shaft 5 into the second part 33 can be likewise pursued independent of assembly of the first part 31. After these processes, by assembling the second part 33 with the first part 31 with inserting the inner shaft 5 into the outer shaft 7, assembly of the PTU 1 is generally completed. As connection between the second clutch member 93 and the outer shaft 7 is simple engagement of the first teeth 101, this process does not cause any difficulty. More specifically, although the PTU 1 according to the present embodiment has a complex structure, it is easy to assemble.

The structure described above further enables easy maintenance. When the solenoid becomes to require maintenance, nothing is necessary other than separating the second part 33 from the first part 31 to expose the solenoid. As it is not required to disassemble the PTU 1 totally, maintenance is made easy.

The structure described above furthermore enables easy modifications to the structure. For example, when the clutch 9 and the actuator 11 are omitted from the second part 33 and instead any member connecting the splines 55 of the inner shaft 5 and the first teeth 101 of the outer shaft 7 are applied thereto, the torque is steadily transmitted to the output shaft 15. More specifically, without replacing the PTU 1 as a whole, a construction of a part-time 4WD can be changed into a construction of a full-time 4WD.

More specifically, the present example solves many problems coming from structural complexity of PTUs.

Although certain embodiments have been described above, modifications and variations of the embodiments described above will occur to those skilled in the art, in light of the above teachings.

The invention claimed is:

1. A power takeoff unit for taking off torque from a transmission of an automobile, comprising:
   a casing dividable into a first part, a second part and a third part;

a hollow inner shaft formed to allow insertion of a transmission shaft and coupled with the transmission to rotate about an axis;

an outer shaft independently rotatable and coaxial with the inner shaft;

a clutch interposed between the inner shaft and the outer shaft and configured to drivingly connect the inner shaft with the outer shaft when the clutch is connected;

an actuator configured to connect the clutch;

an output shaft disposed so as to be rotatable, and to one of intersect with and be not parallel and not intersect with, the outer shaft; and a gear set drivingly coupling the outer shaft with the output shaft, wherein the outer shaft and the output shaft are rotatably supported by the first part, the clutch is rotatably supported by the second part, and the actuator is fixed to the second part, wherein the clutch and the actuator along with the second part are separable from the first part and the third part.

2. The power takeoff unit of claim 1, wherein the clutch comprises a first clutch member drivingly coupled with the inner shaft and a second clutch member engaging with the outer shaft, and the actuator is configured to drive the second clutch member in a direction of the axis.

3. The power takeoff unit of claim 2, wherein the clutch member is coupled with an outer periphery of the inner shaft and the second clutch member engages with an end of the outer shaft in the direction of the axis.

4. The power takeoff unit of claim 2, wherein the second clutch member is engagable with the outer shaft and movable in the direction of the axis to connect with the first clutch member.

5. The power takeoff unit of claim 2, wherein the clutch member is supported by the second part via a bearing interposed therebetween, and the second clutch member is supported by the second part via the actuator interposed therebetween.

6. The power takeoff unit of claim 2, further comprising a sleeve portion that is radially elongated from the actuator and slidably fitted on the second clutch member to support the second clutch member.

7. The power takeoff unit of claim 2, wherein the outer shaft and the second clutch member comprise first teeth extending in the direction of the axis, and each of the first teeth mutually engaged to form a first angle with the axis to bias the second clutch member toward the first clutch member.

8. The power takeoff unit of claim 7, wherein the first clutch member and the second clutch member comprise second teeth extending in the direction of the axis and, each of the second teeth mutually engaged to form a second angle smaller than the first angle with the axis.

9. The power takeoff unit of claim 1, further comprising a first bearing and a second bearing mutually apart in a direction of the axis and said first bearing is interposed between the first part and the outer shaft to support the outer shaft.

* * * * *